(12) United States Patent
Zhang et al.

(10) Patent No.: US 10,320,917 B2
(45) Date of Patent: Jun. 11, 2019

(54) KEY NEGOTIATION PROCESSING METHOD AND APPARATUS

(71) Applicant: Huawei Technologies Co., Ltd., Shenzhen (CN)

(72) Inventors: Bo Zhang, Shenzhen (CN); Chengdong He, Dongguan (CN); Lu Gan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 304 days.

(21) Appl. No.: 15/146,690

(22) Filed: May 4, 2016

(65) Prior Publication Data

US 2016/0248857 A1 Aug. 25, 2016

Related U.S. Application Data

(63) Continuation of application No. PCT/CN2014/077373, filed on May 13, 2014.

(30) Foreign Application Priority Data

Nov. 4, 2013 (CN) .......................... 2013 1 0539299

(51) Int. Cl.
*H04L 29/08* (2006.01)
*H04L 9/08* (2006.01)
(Continued)

(52) U.S. Cl.
CPC .......... *H04L 67/141* (2013.01); *H04L 9/0838* (2013.01); *H04L 63/06* (2013.01);
(Continued)

(58) Field of Classification Search
CPC ......... H04L 9/08; H04L 9/00; H04L 63/0442; H04L 63/06; H04L 9/0838;
(Continued)

(56) References Cited

U.S. PATENT DOCUMENTS 6,931,429 B2 *  8/2005  Gouge .................... H04L 67/16
                                                        709/203
2010/0034384 A1  2/2010  Buecker et al.
(Continued)

FOREIGN PATENT DOCUMENTS

CN          101039180 A       9/2007
CN          101183935 A       5/2008
(Continued)

OTHER PUBLICATIONS

Partial English Translation and Abstract of Chinese Patent Application No. CN101183935, May 18, 2016, 6 pages.
(Continued)

*Primary Examiner* — Thanhnga B Truong
(74) *Attorney, Agent, or Firm* — Conley Rose, P.C.

(57) ABSTRACT

A method and apparatus of key negotiation processing, which includes acquiring, by a control network element, a first key negotiation parameter and a second key negotiation parameter, and sending, by the control network element, the first key negotiation parameter and/or the second key negotiation parameter to the first user equipment UE and a second UE such that the first UE and the second UE generate a key according to the first key negotiation parameter and the second key negotiation parameter. Key negotiation may be performed between two UEs that perform proximity communication.

19 Claims, 7 Drawing Sheets

(51) Int. Cl.
*H04W 12/04* (2009.01)
*H04L 29/06* (2006.01)
*H04W 76/14* (2018.01)

(52) U.S. Cl.
CPC ............ *H04L 69/24* (2013.01); *H04W 12/04* (2013.01); *H04L 2209/80* (2013.01); *H04W 76/14* (2018.02)

(58) Field of Classification Search
CPC ... H04L 63/0428; H04L 63/061; H04L 69/24; H04L 67/141; H04L 67/16; H04L 67/34; H04L 67/18; H04L 69/329; H04W 12/04; H04W 12/02
USPC ............ 380/262, 279, 44, 46; 713/171, 155; 709/203, 225
See application file for complete search history.

(56) References Cited

U.S. PATENT DOCUMENTS

| | | | |
|---|---|---|---|
| 2011/0320802 A1* | 12/2011 | Wang | .................... H04L 9/0822 713/2 |
| 2013/0290696 A1 | 10/2013 | Broustis et al. | |
| 2014/0112474 A1 | 4/2014 | Escott et al. | |
| 2015/0124970 A1* | 5/2015 | Li | ........................ H04L 9/3066 380/283 |

FOREIGN PATENT DOCUMENTS

| | | |
|---|---|---|
| CN | 101536399 A | 9/2009 |
| CN | 101741551 A | 6/2010 |
| WO | 2007023286 A1 | 3/2007 |

OTHER PUBLICATIONS

"3rd Generation Partnership Project; Technical Specification Group Services and System Aspects; Study on architecture enhancements to support, Proximity-based Services (ProSe) (Release)," 3GPP TR 23.703, V0.7.1, Technical Support, Sep. 2013, 262 pages.

"3rd Generation Partnership Project; Technical Specification Group Services and System Aspects, Study on security issues to support Proximity Services (Release 12)," 3GPP TR 33.cde, V0.2.0, Technical Report, Jul. 2013, 21 pages.

Foreign Communication From a Counterpart Application, European Application No. 14858185.3, Extended European Search Report dated Oct. 10, 2016, 8 pages.

Foreign Communication From a Counterpart Application, PCT Application No. PCT/CN2014/077373, English Translation of International Search Report dated Aug. 22, 2014, 2 pages.

Foreign Communication From a Counterpart Application, PCT Application No. PCT/CN2014/077373, English Translation of Written Opinion dated Aug. 22, 2014, 28 pages.

* cited by examiner

KEY NEGOTIATION PROCESSING METHOD AND APPARATUS

CROSS-REFERENCE TO RELATED APPLICATIONS

This application is a continuation of International Application No. PCT/CN2014/077373, filed on May 13, 2014, which claims priority to Chinese Patent Application No. 201310539299.3, filed on Nov. 4, 2013, both of which are hereby incorporated by reference in their entireties.

TECHNICAL FIELD

Embodiments of the present disclosure relate to communications technologies, and in particular, to a key negotiation processing method and apparatus.

BACKGROUND

In an application scenario of proximity communication, communication between two user equipment (UE) does not need to go through an operator network. An objective of a proximity service (ProSe) technology is to establish a secure communication channel between two UEs such that data can be exchanged securely.

The ProSe technology mainly includes two aspects, ProSe Discovery and ProSe communication. At a ProSe Discovery stage, two UEs may detect each other mutually in order to complete verification of identities of the two parties. At a ProSe Communication stage, the two UEs may establish a secure communication channel and then perform secure data communication. Because a communication channel between UEs may be eavesdropped and tampered by an attacker, it is required to perform confidentiality and integrity protection on communication data. Confidentiality and integrity protection needs support of a secure key and cryptographic algorithm, and therefore, it is required to perform key negotiation before secure communication.

Therefore, how two UEs that perform proximity communication perform key negotiation becomes an urgent technical problem to be resolved.

SUMMARY

Embodiments of the present disclosure provide a key negotiation processing method and apparatus to help two UEs that perform proximity communication perform key negotiation.

According to a first aspect, a key negotiation processing method is provided, including acquiring, by a control network element, a first key negotiation parameter and a second key negotiation parameter, and sending, by the control network element, the first key negotiation parameter and/or the second key negotiation parameter to the first user equipment UE and a second UE such that the first UE and the second UE generate a key according to the first key negotiation parameter and the second key negotiation parameter.

With reference to the first aspect, in a first manner, the acquiring, by a control network element, a first key negotiation parameter includes receiving, by the control network element, a third key negotiation parameter sent by the first UE, and generating the first key negotiation parameter according to the third key negotiation parameter and a shared key between the first UE and the control network element, and the acquiring, by a control network element, a second key negotiation parameter includes receiving, by the control network element, a fourth key negotiation parameter sent by the second UE, and generating the second key negotiation parameter according to the fourth key negotiation parameter and a shared key between the second UE and the control network element.

With reference to the first aspect, in a second manner, the acquiring, by a control network element, a first key negotiation parameter includes receiving, by the control network element, the first key negotiation parameter sent by the first UE, and the acquiring, by a control network element, a second key negotiation parameter includes receiving, by the control network element, the second key negotiation parameter sent by the second UE.

With reference to the first manner or the second manner, in a third manner, the sending, by the control network element, the first key negotiation parameter and/or the second key negotiation parameter to the first UE and a second UE includes sending, by the control network element, the second key negotiation parameter to the first UE, and sending the first key negotiation parameter to the second UE.

With reference to the first aspect, in a fourth manner, the acquiring, by a control network element, a first key negotiation parameter and a second key negotiation parameter includes generating, by the control network element, the first key negotiation parameter and the second key negotiation parameter.

With reference to the fourth manner, in a fifth manner, the sending, by the control network element, the first key negotiation parameter and/or the second key negotiation parameter to the first UE and a second UE includes sending, by the control network element, the first key negotiation parameter and the second key negotiation parameter to the first UE, and sending, by the control network element, the first key negotiation parameter and the second key negotiation parameter to the second UE.

With reference to the first aspect, in a sixth manner, the control network element includes a first control network element to which the first UE is attached and a second control network element to which the second UE is attached, and the acquiring, by a control network element, a first key negotiation parameter and a second key negotiation parameter includes receiving, by the first control network element, a third key negotiation parameter sent by the first UE, generating the first key negotiation parameter according to the third key negotiation parameter and a shared key between the first UE and the control network element, and sending the first key negotiation parameter to the second control network element such that the second control network element sends the first key negotiation parameter to the second UE, and receiving, by the second control network element, a fourth key negotiation parameter sent by the second UE, generating the second key negotiation parameter according to the fourth key negotiation parameter and a shared key between the second UE and the control network element, and sending the second key negotiation parameter to the first control network element such that the first control network element sends the second key negotiation parameter to the first UE.

With reference to the first aspect, in a seventh manner, the control network element includes a first control network element to which the first UE is attached and a second control network element to which the second UE is attached, and the acquiring, by a control network element, a first key negotiation parameter and a second key negotiation parameter includes receiving, by the first control network element, the first key negotiation parameter sent by the first UE, and sending the first key negotiation parameter to the second control network element such that the second control network element sends the first key negotiation parameter to the second UE, and receiving, by the second control network element, the second key negotiation parameter sent by the second UE, and sending the second key negotiation parameter to the first control network element such that the first control network element sends the second key negotiation parameter to the first UE.

With reference to the sixth manner or the seventh manner, in an eighth manner, the sending, by the control network element, the first key negotiation parameter and/or the second key negotiation parameter to the first UE and a second UE includes sending, by the first control network element, the second key negotiation parameter to the first UE, and sending, by the second control network element, the first key negotiation parameter to the second UE.

With reference to the first aspect, in a ninth manner, the control network element includes a first control network element to which the first UE is attached and a second control network element to which the second UE is attached, and the acquiring, by a control network element, a first key negotiation parameter and a second key negotiation parameter includes generating, by the first control network element, the first key negotiation parameter, and sending the first key negotiation parameter to the second control network element, and generating, by the second control network element, the second key negotiation parameter, and sending the second key negotiation parameter to the first control network element.

With reference to the ninth manner, in a tenth manner, the sending, by the control network element, the first key negotiation parameter and/or the second key negotiation parameter to the first UE and a second UE includes sending, by the first control network element, the first key negotiation parameter and the second key negotiation parameter to the first UE, and sending, by the second control network element, the first key negotiation parameter and the second key negotiation parameter to the second UE.

With reference to the first manner or the sixth manner, in an eleventh manner, the shared key includes one or a combination of the following keys an authentication vector underlying key access security management entity (Kasme), a non-access stratum (NAS) key, and a next hop (NH) key.

With reference to any one of the foregoing manners, in a twelfth manner, the key negotiation parameter includes one or any combination of the following parameters: a nonce, a connection identity (ID), a radio resource connection ID, an application ID, a cell radio network temporary identifier (C-RNTI), a count value of a counter, and a constant.

According to a second aspect, a key negotiation processing method is provided, including receiving, by a first user equipment UE, a key negotiation parameter sent by a control network element, and generating, by the first UE, a key according to the key negotiation parameter.

With reference to the second aspect, in a first manner, before the receiving, by a first UE, a key negotiation parameter sent by a control network element, the method further includes sending, by the first UE, a third key negotiation parameter to the control network element such that the control network element generates a first key negotiation parameter according to the third key negotiation parameter and a shared key between the first UE and the control network element, the receiving, by a first UE, a key negotiation parameter sent by a control network element includes receiving, by the first UE, a second key negotiation parameter sent by the control network element, where the second key negotiation parameter is generated by the control network element according to a fourth key negotiation parameter sent by a second UE and a shared key between the second UE and the control network element, and the generating, by the first UE, a key according to the key negotiation parameter includes generating, by the first UE, the first key negotiation parameter according to the third key negotiation parameter and the shared key between the first UE and the control network element, and generating, by the first UE, the key according to the first key negotiation parameter and the second key negotiation parameter.

With reference to the second aspect, in a second manner, before the receiving, by a first UE, a key negotiation parameter sent by a control network element, the method further includes sending, by the first UE, a first key negotiation parameter to the control network element such that the control network element sends the first key negotiation parameter to the second UE, the receiving, by a first UE, a key negotiation parameter sent by a control network element includes receiving, by the first UE, a second key negotiation parameter sent by the control network element, where the second key negotiation parameter is sent by the second UE to the control network element, and the generating, by the first UE, a key according to the key negotiation parameter includes generating, by the first UE, the key according to the first key negotiation parameter and the second key negotiation parameter.

With reference to the second aspect, in a third manner, the receiving, by a first UE, a key negotiation parameter sent by a control network element includes receiving, by the first UE, a first key negotiation parameter and a second key negotiation parameter sent by the control network element, and the generating, by the first UE, a key according to the key negotiation parameter includes generating, by the first UE, the key according to the first key negotiation parameter and the second key negotiation parameter.

With reference to the first manner, in a fourth manner, the shared key includes one or a combination of the following keys an authentication vector underlying key Kasme, a NAS key, and a NH key.

With reference to any one of the foregoing manners, the key negotiation parameter includes one or any combination of the following parameters: a nonce, a connection ID, a radio resource connection ID, an application ID, C-RNTI, a count value of a counter, and a constant.

According to a third aspect, a control network element is provided, including an acquiring module configured to acquire a first key negotiation parameter and a second key negotiation parameter, and a sending module configured to send the first key negotiation parameter and/or the second key negotiation parameter to the first user equipment UE and a second UE such that the first UE and the second UE generate a key according to the first key negotiation parameter and the second key negotiation parameter.

With reference to the third aspect, in a first manner, the acquiring module is further configured to receive a third key negotiation parameter sent by the first UE, and generate the first key negotiation parameter according to the third key negotiation parameter and a shared key between the first UE and the control network element, and receive a fourth key negotiation parameter sent by the second UE, and generate the second key negotiation parameter according to the fourth key negotiation parameter and a shared key between the second UE and the control network element.

With reference to the third aspect, in a second manner, the acquiring module is further configured to receive the first key negotiation parameter sent by the first UE, and receive the second key negotiation parameter sent by the second UE.

The sending module is further configured to send the second key negotiation parameter to the first UE, and send the first key negotiation parameter to the second UE.

With reference to the third aspect, in a fifth manner, the acquiring module is further configured to generate the first key negotiation parameter and the second key negotiation parameter.

The sending module is further configured to send the first key negotiation parameter and the second key negotiation parameter to the first UE, and send the first key negotiation parameter and the second key negotiation parameter to the second UE.

With reference to the first manner, in a seventh manner, the shared key includes one or a combination of the following keys an authentication vector underlying key Kasme, a NAS key, and a NH key.

With reference to any one of the foregoing manners, in an eighth manner, the key negotiation parameter includes one or any combination of the following parameters: a nonce, a connection ID, a radio resource connection ID, an application ID, a C-RNTI, a count value of a counter, and a constant.

According to a fourth aspect, a control system is provided, including a first control network element to which a first UE is attached and a second control network element to which a second UE is attached, where the first control network element interacts with the second control network element in order to send the first key negotiation parameter and/or a second key negotiation parameter to the first user equipment UE and the second UE such that the first UE and the second UE generate a key according to the first key negotiation parameter and the second key negotiation parameter.

With reference to the fourth aspect, in a first manner, the first control network element is further configured to receive a third key negotiation parameter sent by the first UE, generate the first key negotiation parameter according to the third key negotiation parameter and a shared key between the first UE and the control network element, and send the first key negotiation parameter to the second control network element such that the second control network element sends the first key negotiation parameter to the second UE, and the second control network element is further configured to receive a fourth key negotiation parameter sent by the second UE, generate the second key negotiation parameter according to the fourth key negotiation parameter and a shared key between the second UE and the control network element, and send the second key negotiation parameter to the first control network element such that the first control network element sends the second key negotiation parameter to the first UE.

With reference to the fourth aspect, in a second manner, the first control network element is further configured to receive the first key negotiation parameter sent by the first UE, and send the first key negotiation parameter to the second control network element such that the second control network element sends the first key negotiation parameter to the second UE, and the second control network element is further configured to receive the second key negotiation parameter sent by the second UE, and send the second key negotiation parameter to the first control network element such that the first control network element sends the second key negotiation parameter to the first UE.

With reference to the first manner or the second manner, in a third manner, the first control network element is further configured to send the second key negotiation parameter to the first UE, and the second control network element is further configured to send the first key negotiation parameter to the second UE.

With reference to the fourth aspect, in a fourth manner, the first control network element is further configured to generate the first key negotiation parameter, and send the first key negotiation parameter to the second control network element, and the second control network element is further configured to generate the second key negotiation parameter, and send the second key negotiation parameter to the first control network element.

With reference to the fourth manner, in a fifth manner, the first control network element is further configured to send the first key negotiation parameter and the second key negotiation parameter to the first UE, and the second control network element is further configured to send the first key negotiation parameter and the second key negotiation parameter to the second UE.

With reference to the first aspect, in a sixth manner, the shared key includes one or a combination of the following keys an authentication vector underlying key Kasme, a NAS key, and a NH key.

With reference to any one of the foregoing manners, in a seventh manner, the key negotiation parameter includes one or any combination of the following parameters: a nonce, a connection ID, a radio resource connection ID, an application ID, a C-RNTI, a count value of a counter, and a constant.

According to a fifth aspect, a user equipment is provided, where the user equipment is a first user equipment, and the first user equipment includes an interaction module configured to receive a key negotiation parameter sent by a control network element, and a generation module configured to generate a key according to the key negotiation parameter.

With reference to the fifth aspect, in a first manner, the interaction module is further configured to before receiving the key negotiation parameter sent by the control network element, send a third key negotiation parameter to the control network element such that the control network element generates a first key negotiation parameter according to the third key negotiation parameter and a shared key between the first UE and the control network element, correspondingly, the interaction module is further configured to receive a second key negotiation parameter sent by the control network element, where the second key negotiation parameter is generated by the control network element according to a fourth key negotiation parameter sent by a second UE and a shared key between the second UE and the control network element, and the generation module is further configured to generate the first key negotiation parameter according to the third key negotiation parameter and the shared key between the first UE and the control network element, and generate the key according to the first key negotiation parameter and the second key negotiation parameter.

With reference to the fifth aspect, in a second manner, the interaction module is further configured to before receiving the key negotiation parameter sent by the control network element, send a first key negotiation parameter to the control network element such that the control network element sends the first key negotiation parameter to the second UE, correspondingly, the interaction module is further configured to receive a second key negotiation parameter sent by the control network element, where the second key negotiation parameter is sent by the second UE to the control network element, and the generation module is further configured to generate the key according to the first key negotiation parameter and the second key negotiation parameter.

With reference to the fifth aspect, in a third manner, the interaction module is further configured to receive a first key negotiation parameter and a second key negotiation parameter sent by the control network element, and the generation module is further configured to generate the key according to the first key negotiation parameter and the second key negotiation parameter.

With reference to the first manner, in a fourth manner, the shared key includes one or a combination of the following keys: an authentication vector underlying key Kasme, a NAS key, and a NH key.

With reference to any one of the foregoing manners, in a fifth manner, the key negotiation parameter includes one or any combination of the following parameters a nonce, a connection ID, a radio resource connection ID, an application ID, a C-RNTI, a count value of a counter, and a constant.

In the embodiments of the present disclosure, when two UEs that need to perform proximity communication are performing key negotiation, a negotiation process may be controlled by a control network element. The control network element may acquire a first key negotiation parameter and a second key negotiation parameter and send the first key negotiation parameter and/or the second key negotiation parameter to a first UE and a second UE such that the first UE and the second UE can generate a key according to the first key negotiation parameter and the second key negotiation parameter. The control network element may control implementation of the key negotiation process, which ensures reliability and high efficiency of key negotiation.

BRIEF DESCRIPTION OF DRAWINGS

To describe the technical solutions in the embodiments of the present disclosure more clearly, the following briefly introduces the accompanying drawings required for describing the embodiments or the prior art. The accompanying drawings in the following description show some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by persons of ordinary skill in the art based on the embodiments of the present disclosure without creative efforts shall fall within the protection scope of the present disclosure.

Figure 1:
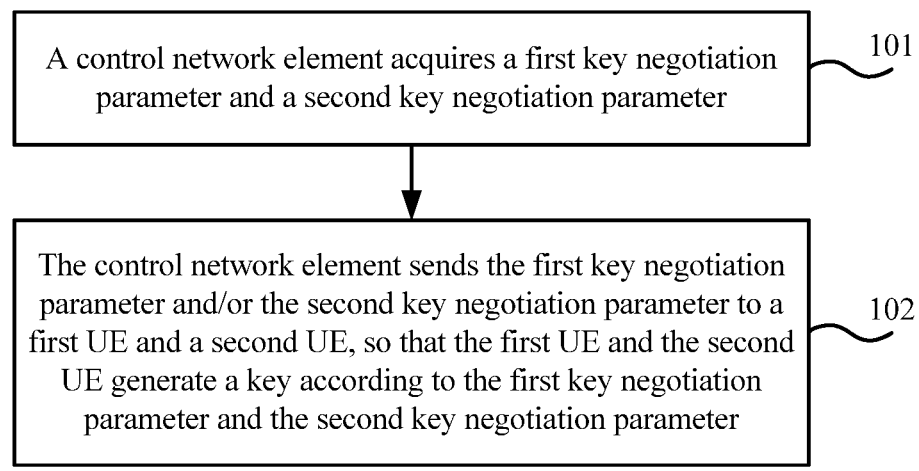
FIG. 1 is a flowchart of a key negotiation processing method according to a first embodiment of the present disclosure.

FIG. 1 is a flowchart of a first embodiment of a key negotiation processing method according to the present disclosure. As shown in FIG. 1, the method in this embodiment may include the following steps:

Step 101. A control network element acquires a first key negotiation parameter and a second key negotiation parameter.

Step 102. The control network element sends the first key negotiation parameter and/or the second key negotiation parameter to a first UE and a second UE such that the first UE and the second UE generate a key according to the first key negotiation parameter and the second key negotiation parameter.

Furthermore, for two UEs that need to perform proximity communication, the control network element may acquire a first key negotiation parameter and a second key negotiation parameter, where the first key negotiation parameter and the second key negotiation parameter are used by the two UEs to generate a key.

For example, the first key negotiation parameter is corresponding to the first UE, and the second key negotiation parameter is corresponding to the second UE. The first key negotiation parameter may be generated by the first UE, and the first UE notifies the control network element of the first key negotiation parameter, or may be generated by the control network element. Similarly, the second key negotiation parameter may be generated by the second UE, and the second UE notifies the control network element of the second key negotiation parameter, or may be generated by the control network element. After the control network element obtains the two key negotiation parameters, the control network element may notify the first UE and the second UE of the two key negotiation parameters such that the first UE and the second UE generate a key according to the first key negotiation parameter and the second key negotiation parameter.

In this embodiment, the so-called "and/or" means if the first key negotiation parameter is generated by the first UE, the control network element needs to send only the second key negotiation parameter of the second UE to the first UE, if the first key negotiation parameter is generated by the control network element, the control network element needs to send both the first key negotiation parameter and the second key negotiation parameter to the first UE. For the second UE, its process is similar.

In this embodiment, when two UEs that need to perform proximity communication are performing key negotiation, a negotiation process may be controlled by a control network element. The control network element may acquire a first key negotiation parameter and a second key negotiation parameter and send the first key negotiation parameter and/or the second key negotiation parameter to a first UE and a second UE such that the first UE and the second UE can generate a key according to the first key negotiation parameter and the second key negotiation parameter. The control network element may control implementation of the key negotiation process, which ensures reliability and high efficiency of key negotiation.

The following describes the technical solution shown in FIG. 1 in detail using several specific embodiments.

Figure 2:
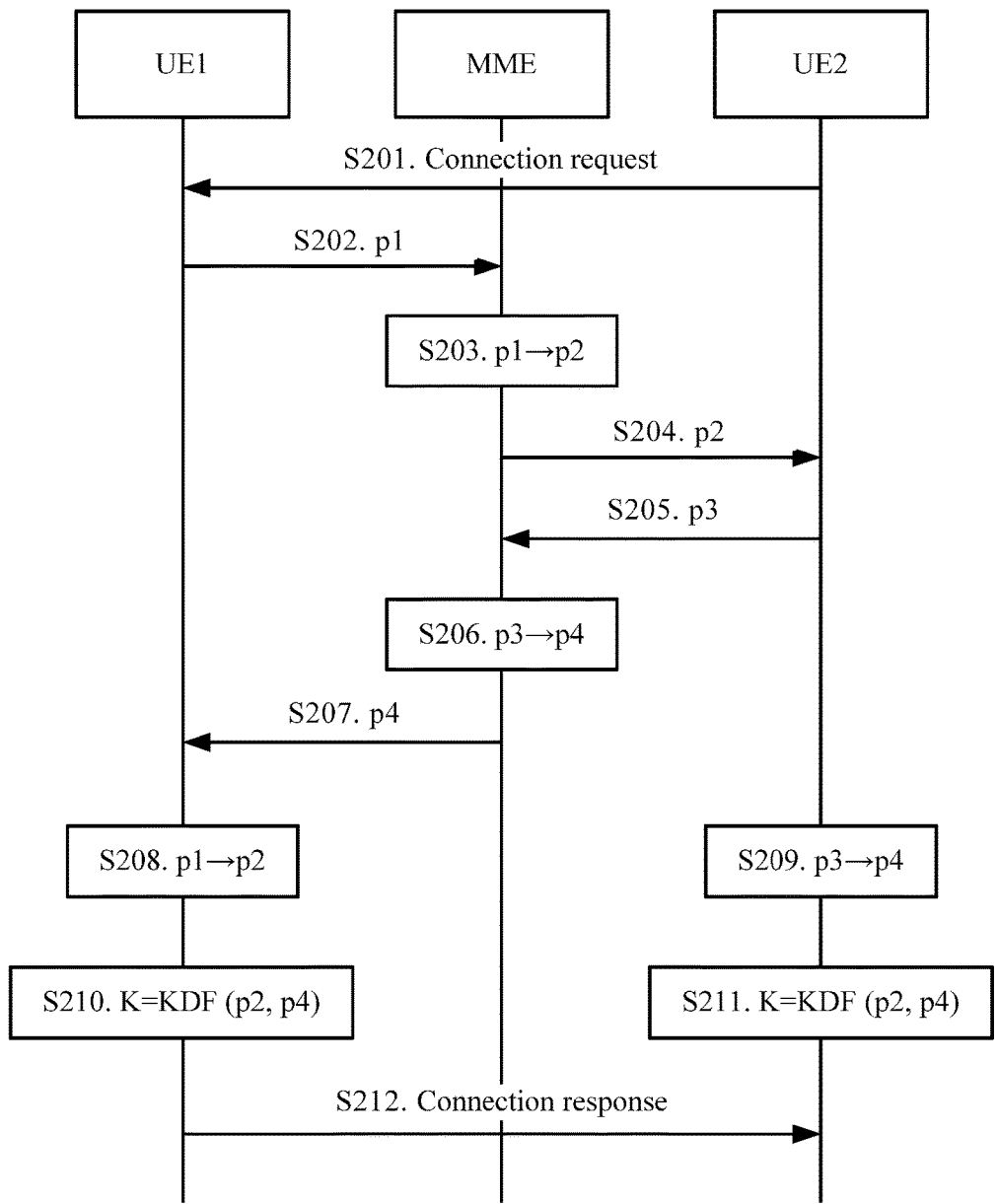
FIG. 2 is a signaling flowchart of a key negotiation processing method according to a second embodiment of the present disclosure.

FIG. 2 is a signaling flowchart of a second embodiment of a key negotiation processing method according to the present disclosure. As shown in FIG. 2, in this embodiment, that a control network element is a mobility management entity (MME) is used as an example for description, and the method in this embodiment may include the following steps:

Step S201. A UE2 sends a connection request (e.g., Direct-Connection-Request) to a UE1.

Step S202. The UE1 selects a key negotiation parameter p1 and sends p1 to the MME.

Herein p1 may be one or any combination of parameters that are selected by the UE1 from the following parameters: a nonce, a connection ID, a radio resource connection ID, an application ID, a C-RNTI, a count value of a counter, and a constant.

The application ID may be an identity of an application that uses a ProSe function, and the C-RNTI is an identifier of a cell in which a UE is located.

Step S203. The MME calculates a key negotiation parameter p2 according to p1 and a shared key (e.g., SharedKey (UE1-MME)) between the UE1 and the MME, where p2=KDF (SharedKey (UE1-MME1), p1), where KDF is a key derivation function.

SharedKey (UE1-MME1) herein indicates a shared key between the UE1 and the MME. For example, SharedKey may be one of the following three shared keys between the UE1 and the MME: an authentication vector underlying key Kasme, a NAS key, and a NH key, or a combination of these values.

Step S204. The MME sends p2 to the UE2.

Step S205. The UE2 stores p2, selects a key negotiation parameter p3, and sends p3 to the MME.

The meaning of p3 herein is the same as that of p1.

Step S206. The MME calculates a key negotiation parameter p4 according to p3 and a shared key (e.g., SharedKey (UE2-MME2)) between the UE2 and the MME, where p4=KDF (SharedKey (UE2-MME2), p3).

The meaning of p4 herein is the same as that of p2.

Step S207. The MME sends p4 to the UE1.

Step S208. The UE1 calculates p2 using an algorithm same as that used by the MME.

Alternatively, this step may be performed after S202.

Step S209. The UE2 calculates p4 using an algorithm same as that used by the MME.

Steps S208 and S209 may be performed concurrently.

Step S210. The UE1 calculates a key K=KDF (p2, p4) according to p2 and p4.

Step S211. The UE2 calculates the key K=KDF (p2, p4) according to p2 and p4.

Herein, p2 or p4 is used as an input key of the KDF function to participate in generation of the key K.

Steps S210 and S211 may be performed concurrently.

So far, both communication parties the UE1 and the UE2 obtain the key K.

Afterward, the UE1 and the UE2 may perform encryption/integrity protection on data between them using the key K, and may further generate, using the key K, a session key to perform encryption/integrity protection on data between them.

Step S212. The UE1 sends a Direct-Connection-Response to the UE2.

In this embodiment, when a UE1 and a UE2 that need to perform proximity communication are performing key negotiation, an MME may convert a key negotiation parameter generated by the UE1 and then send a converted key negotiation parameter to the UE2, and the MME may further convert a key negotiation parameter generated by the UE2 and then send a converted key negotiation parameter to the UE1. Therefore, the UE1 may determine a key based on the generated key negotiation parameter and the received key negotiation parameter. Likewise, the UE2 may also determine a key based on the generated key negotiation parameter and the received key negotiation parameter. In addition, because the UE1 and the UE2 use a same key generation algorithm, the key determined by the UE1 and the key determined by the UE2 are the same, therefore, the UE1 and the UE2 can perform proximity communication using the key. In this embodiment, an MME controlled by an operator controls key negotiation, which may avoid unreliability resulted when a single-party UE determines a key, and a key negotiation process is simple and efficient.

Figure 3:
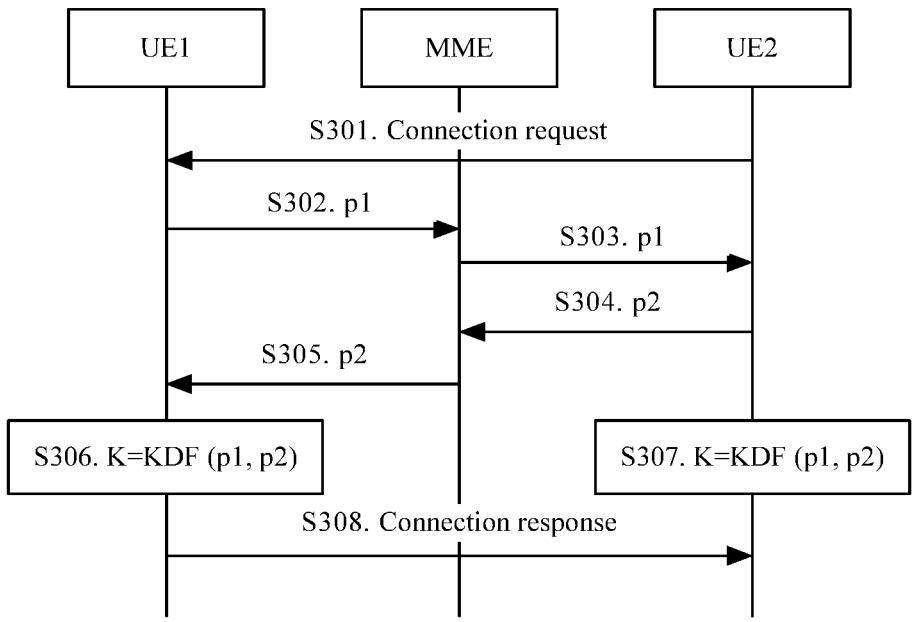
FIG. 3 is a signaling flowchart of a key negotiation processing method according to a third embodiment of the present disclosure.

FIG. 3 is a signaling flowchart of a third embodiment of a key negotiation processing method according to the present disclosure. As shown in FIG. 3, a difference between this embodiment and the embodiment shown in FIG. 2 is as follows In the embodiment shown in FIG. 2, after receiving the key negotiation parameter sent by UE1 and the key negotiation parameter sent by UE2, the MME needs to perform KDF conversion, but in this embodiment, it is not required to perform KDF conversion. The method in this embodiment may include the following steps:

Step S301. A UE2 sends a Direct-Connection-Request to a UE1.

Step S302. The UE1 selects a key negotiation parameter p1 and sends p1 to an MME.

Step S303. The MME sends p1 to the UE2.

Step S304. The UE2 stores p1, selects a key negotiation parameter p2, and sends p2 to the MME.

Step S305. The MME sends p2 to the UE1.

Step S306. The UE1 calculates a key K=KDF (p1, p2) according to p1 and p2.

Step S307. The UE2 calculates the key K=KDF (p1, p2) according to p1 and p2.

Steps S306 and S307 may be performed concurrently.

Step S308. The UE1 sends a Direct-Connection-Response to the UE2.

An implementation process of this embodiment is similar to that of the embodiment shown in FIG. 2. Compared with that in the embodiment shown in FIG. 2, a key negotiation process in this embodiment is simpler and more efficient.

Figure 4:
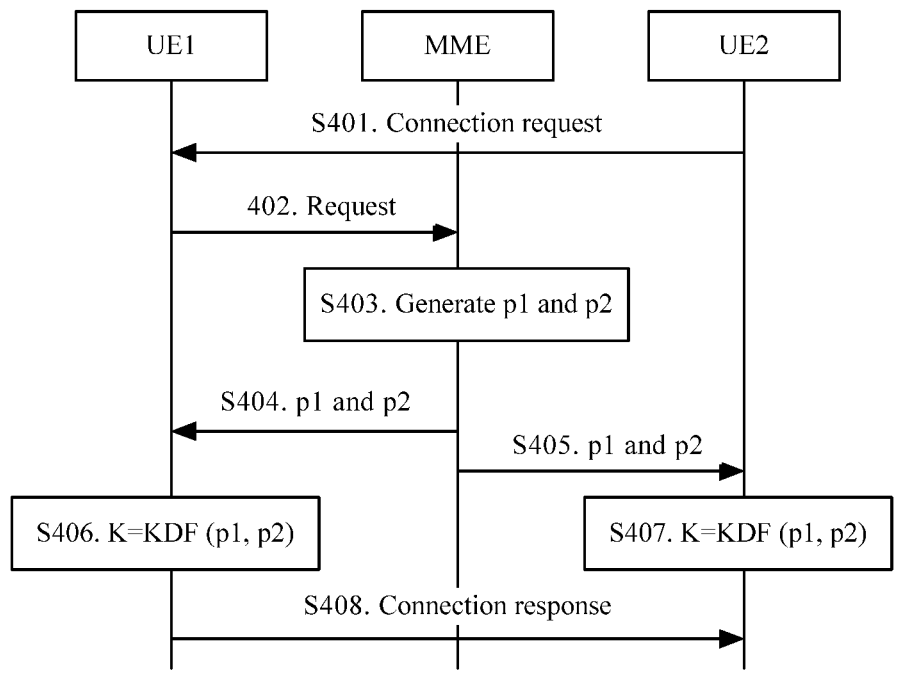
FIG. 4 is a signaling flowchart of a key negotiation processing method according to a fourth embodiment of the present disclosure.

FIG. 4 is a signaling flowchart of a fourth embodiment of a key negotiation processing method according to the present disclosure. As shown in FIG. 4, a difference between this embodiment and the embodiments shown in FIG. 2 and FIG.

3 is as follows: In the embodiments shown in FIG. 2 and FIG. 3, a UE needs to generate a key negotiation parameter, but in this embodiment, a key negotiation parameter is generated solely by an MME. The method in this embodiment may include the following steps:

Step S401. A UE2 sends a Direct-Connection-Request to a UE1.

Step S402. The UE1 sends a request to the MME.

Step S403. The MME generates p1 and p2.

Step S404. The MME sends p1 and p2 to the UE1.

Step S405. The MME sends p1 and p2 to the UE2.

Steps S404 and S405 may be performed concurrently.

Step S406. The UE1 calculates a key K=KDF (p1, p2) according to p1 and p2.

Step S407. The UE2 calculates the key K=KDF (p1, p2) according to p1 and p2.

Steps S406 and S407 may be performed concurrently.

Step S408. The UE1 sends a Direct-Connection-Response to the UE2.

An implementation process of this embodiment is similar to those of the embodiments shown in FIG. 2 and FIG. 3. Compared with those in the embodiments shown in FIG. 2 and FIG. 3, a key negotiation process in this embodiment is entirely controlled by an MME, which may further improve reliability of key negotiation.

The foregoing FIG. 2 to FIG. 4 show technical solutions when a UE1 and a UE2 are attached to a same MME. The following describes, using several embodiments, technical solutions when a UE1 and a UE2 are attached to different MMEs.

Figure 5:
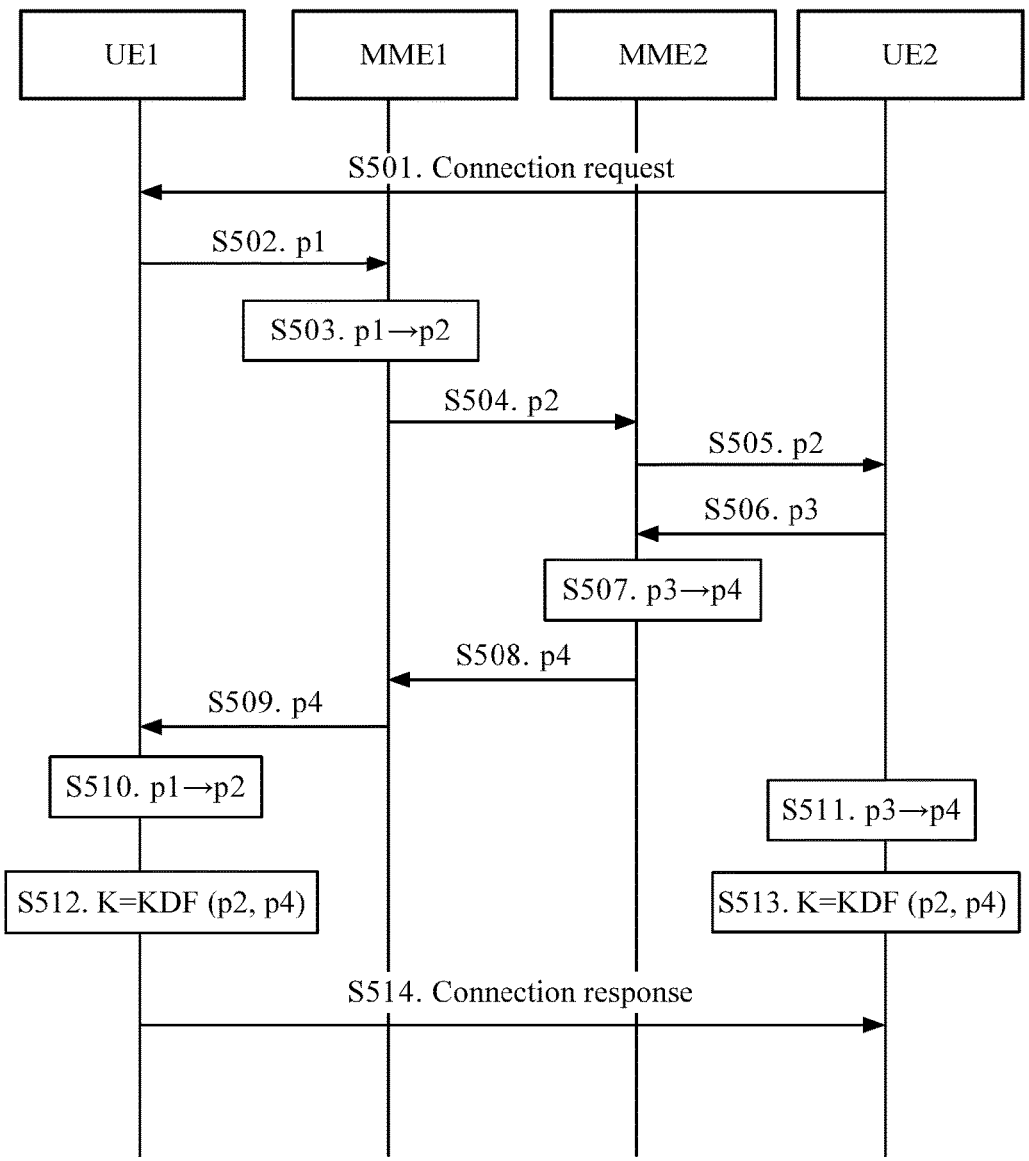
FIG. 5 is a signaling flowchart of a key negotiation processing method according to a fifth embodiment of the present disclosure.

FIG. 5 is a signaling flowchart of a fifth embodiment of a key negotiation processing method according to the present disclosure. As shown in FIG. 5, the method in this embodiment may include the following steps:

Step S501. A UE2 sends a Direct-Connection-Request to a UE1.

Step S502. The UE1 selects a parameter p1 and sends p1 to an MME1.

Step S503. The MME1 calculates a parameter p2 according to p1 and a shared key (e.g., SharedKey (UE1-MME1)) between the UE1 and the MME1, where p2=KDF (SharedKey (UE1-MME1), p1).

Step S504. The MME1 sends p2 to an MME2.

Step S505. The MME2 sends p2 to the UE2.

Step S506. The UE2 stores p2, selects a parameter p3, and sends p3 to the MME2.

Step S507. The MME2 calculates a parameter p4 according to p3 and a shared key (e.g., SharedKey (UE2-MME2)) between the UE2 and the MME2, where p4=KDF (SharedKey (UE2-MME2), p3).

Step S508. The MME2 sends p4 to the MME1.

Step S509. The MME1 sends p4 to the UE1.

Step S510. The UE1 calculates p2 using an algorithm same as that used by the MME.

Step S511. The UE2 calculates p4 using an algorithm same as that used by the MME2.

Steps S510 and S511 may be performed concurrently.

Step S512. The UE1 calculates a shared key K=KDF (p2, p4) according to p2 and p4.

Step S513. The UE2 calculates the shared key K=KDF (p2, p4) according to p2 and p4.

Herein, p2 or p4 is used as an input key of the KDF function to participate in generation of the shared key K.

Steps S512 and S513 may be performed concurrently.

So far, both communication parties the UE1 and the UE2 obtain the shared key K.

Step S514. The UE1 sends a Direct-Connection-Response to the UE2.

An implementation process of this embodiment is similar to that of the embodiment shown in FIG. 2, and details are not described herein again.

Figure 6:
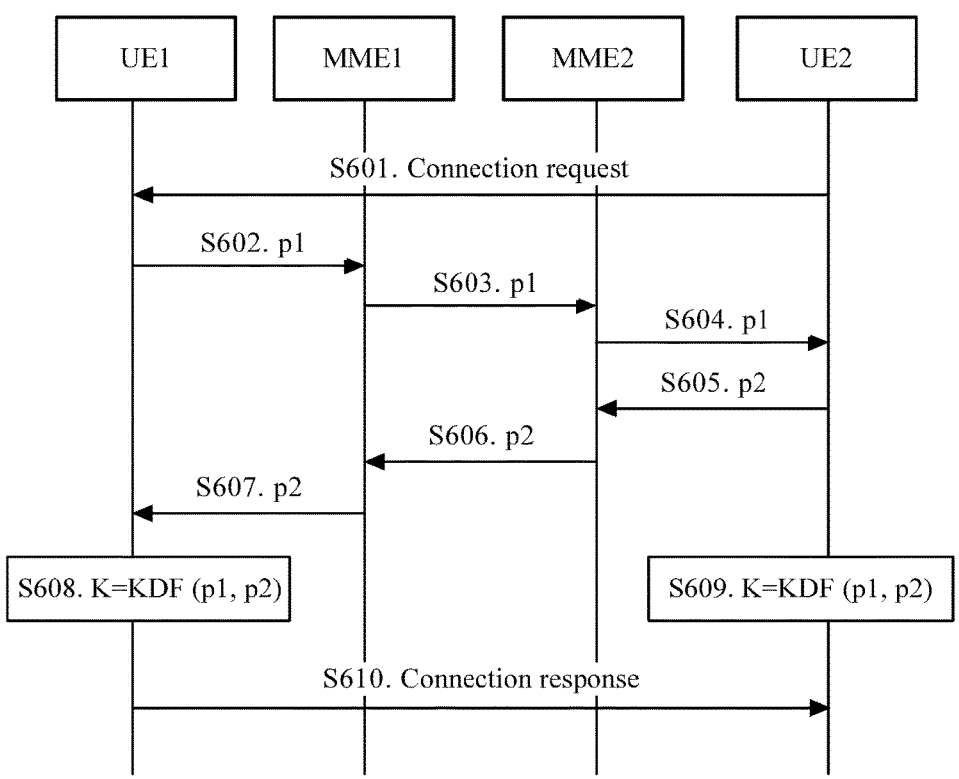
FIG. 6 is a signaling flowchart of a key negotiation processing method according to a sixth embodiment of the present disclosure.

FIG. 6 is a signaling flowchart of a sixth embodiment of a key negotiation processing method according to the present disclosure. As shown in FIG. 6, the method in this embodiment may include the following steps:

Step S601. A UE2 sends a Direct-Connection-Request to a UE1.

Step S602. The UE1 selects a parameter p1 and sends p1 to an MME1.

Step S603. The MME1 sends p1 to an MME2.

Step S604. The MME2 sends p1 to the UE2.

Step S605. The UE2 stores p1, selects a parameter p2, and sends p2 to the MME2.

Step S606. The MME2 sends p2 to the MME1.

Step S607. The MME1 sends p2 to the UE1.

Step S608. The UE1 calculates a shared key K=KDF (p1, p2) according to p1 and p2.

Step S609. The UE2 calculates the shared key K=KDF (p1, p2) according to p1 and p2.

Steps S608 and S609 may be performed concurrently.

So far, both communication parties the UE1 and the UE2 obtain the shared key K.

Step S610. The UE1 sends a Direct-Connection-Response to the UE2.

An implementation process of this embodiment is similar to that of the embodiment shown in FIG. 3, and details are not described herein again.

Figure 7:
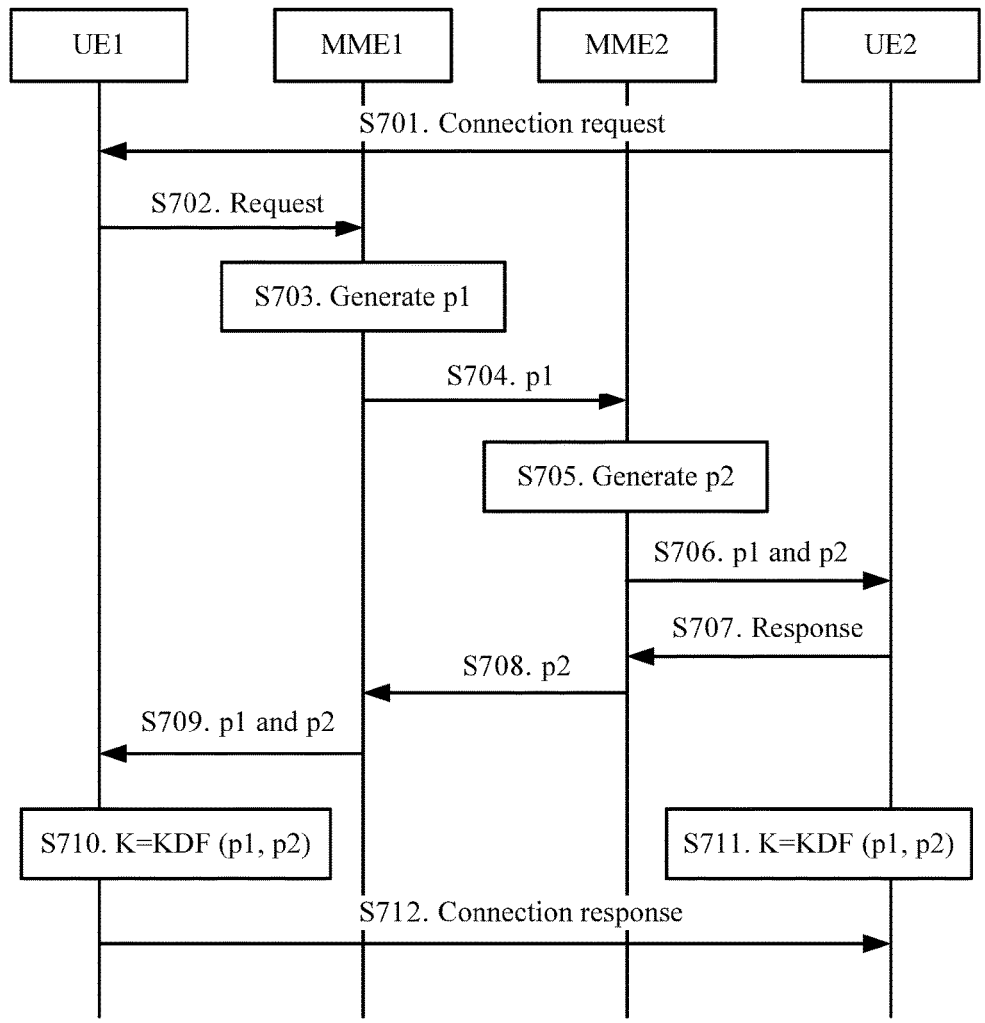
FIG. 7 is a signaling flowchart of a key negotiation processing method according to a seventh embodiment of the present disclosure.

FIG. 7 is a signaling flowchart of a seventh embodiment of a key negotiation processing method according to the present disclosure. As shown in FIG. 7, the method in this embodiment may include the following steps:

Step S701. A UE2 sends a Direct-Connection-Request to a UE1.

Step S702. The UE1 sends a request to an MME1.

Step S703. The MME1 generates p1.

Step S704. The MME1 sends p1 to an MME2.

Step S705. The MME2 generates p2.

Step S706. The MME2 sends p1 and p2 to the UE2.

Step S707. The UE2 sends a response to the MME2.

Step S708. The MME2 sends p2 to the MME1.

Step S709. The MME1 sends p1 and p2 to the UE1.

Step S710. The UE1 calculates a key K=KDF (p1, p2) according to p1 and p2.

Step S711. The UE2 calculates the key K=KDF (p1, p2) according to p1 and p2.

Steps S710 and S711 may be performed concurrently.

Step S712. The UE1 sends a Direct-Connection-Response to the UE2.

Figure 8:
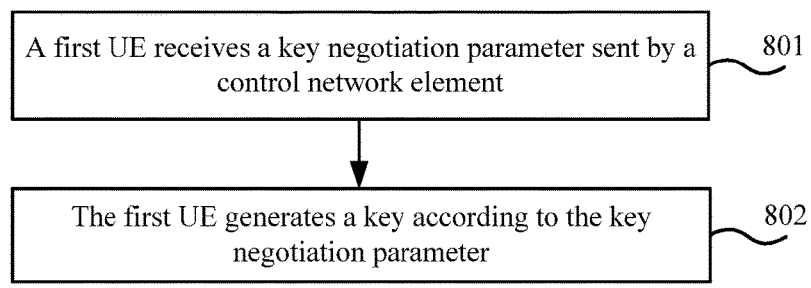
FIG. 8 is a flowchart of a key negotiation processing method according to an eighth embodiment of the present disclosure.

FIG. 8 is a flowchart of an eighth embodiment of a key negotiation processing method according to the present disclosure. As shown in FIG. 8, the method in this embodiment may include the following steps:

Step 801. A first UE receives a key negotiation parameter sent by a control network element.

Step 802. The first UE generates a key according to the key negotiation parameter.

In this embodiment, when two UEs that need to perform proximity communication are performing key negotiation, a negotiation process may be controlled by a control network element. A first UE may receive a key negotiation parameter sent by the control network element such that the first UE may generate a key according to the key negotiation parameter. The control network element may control implementation of the key negotiation process, which ensures reliability and high efficiency of key negotiation.

In an implementation manner, before step S801, the method may further include: sending, by the first UE, a third key negotiation parameter to the control network element such that the control network element generates a first key negotiation parameter according to the third key negotiation parameter and a shared key between the first UE and the control network element.

Correspondingly, step 801 may further include: receiving, by the first UE, a second key negotiation parameter sent by the control network element, where the second key negotiation parameter is generated by the control network element according to a fourth key negotiation parameter sent by a second UE and a shared key between the second UE and the control network element.

Step 802 may further include generating, by the first UE, the first key negotiation parameter according to the third key negotiation parameter and the shared key between the first UE and the control network element, and generating, by the first UE, the key according to the first key negotiation parameter and the second key negotiation parameter.

For specific implementation of the technical solution, reference may be made to the technical solution of the method embodiment shown in FIG. 2 or FIG. 5, and implementation principles and technical effects of the technical solution are similar and are not described herein again.

In another implementation manner, before step 801, the method may further include: sending, by the first UE, a first key negotiation parameter to the control network element such that the control network element sends the first key negotiation parameter to a second UE.

Correspondingly, 801 may further include: receiving, by the first UE, a second key negotiation parameter sent by the control network element, where the second key negotiation parameter is sent by the second UE to the control network element.

Step 802 may further include generating, by the first UE, the key according to the first key negotiation parameter and the second key negotiation parameter.

For specific implementation of the technical solution, reference may be made to the technical solution of the method embodiment shown in FIG. 3 or FIG. 6, and implementation principles and technical effects of the technical solution are similar and are not described herein again.

In still another implementation manner, 801 may further include: receiving, by the first UE, a first key negotiation parameter and a second key negotiation parameter sent by the control network element.

Step 802 may further include generating, by the first UE, the key according to the first key negotiation parameter and the second key negotiation parameter.

For specific implementation of the technical solution, reference may be made to the technical solution of the method embodiment shown in FIG. 4 or FIG. 7, and implementation principles and technical effects of the technical solution are similar and are not described herein again.

Figure 9:
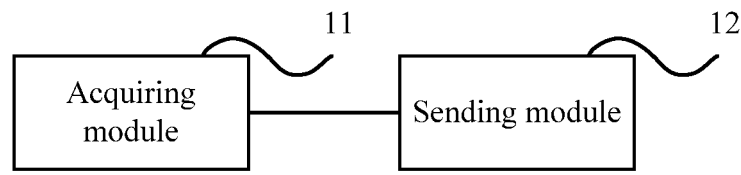
FIG. 9 is a schematic structural diagram of a control network element according to an embodiment of the present disclosure.

FIG. 9 is a schematic structural diagram of an embodiment of a control network element according to the present disclosure. As shown in FIG. 9, the control network element in this embodiment may include an acquiring module 11 and a sending module 12, where: the acquiring module 11 is configured to acquire a first key negotiation parameter and a second key negotiation parameter, and the sending module 12 is configured to send the first key negotiation parameter and/or the second key negotiation parameter to the first user equipment UE and a second UE such that the first UE and the second UE generate a key according to the first key negotiation parameter and the second key negotiation parameter.

The control network element in this embodiment may be configured to execute the technical solution of the method embodiment shown in FIG. 1. Implementation principles and technical effects of the control network element are similar and are not described herein again.

In an implementation manner, the acquiring module 11 is further configured to receive a third key negotiation parameter sent by the first UE, and generate the first key negotiation parameter according to the third key negotiation parameter and a shared key between the first UE and the control network element, and receive a fourth key negotiation parameter sent by the second UE, and generate the second key negotiation parameter according to the fourth key negotiation parameter and a shared key between the second UE and the control network element.

The sending module 12 is further configured to send the second key negotiation parameter to the first UE, and send the first key negotiation parameter to the second UE.

The shared key includes one or a combination of the following keys: an authentication vector underlying key Kasme, a NAS key, and a NH key.

For specific implementation of the technical solution, reference may be made to the technical solution of the method embodiment shown in FIG. 2, and implementation principles and technical effects of the technical solution are similar and are not described herein again.

In another implementation manner, the acquiring module 11 is further configured to receive the first key negotiation parameter sent by the first UE, and receive the second key negotiation parameter sent by the second UE.

The sending module 12 is further configured to send the second key negotiation parameter to the first UE, and send the first key negotiation parameter to the second UE.

For specific implementation of the technical solution, reference may be made to the technical solution of the method embodiment shown in FIG. 3, and implementation principles and technical effects of the technical solution are similar and are not described herein again.

In still another implementation manner, the acquiring module 11 is further configured to generate the first key negotiation parameter and the second key negotiation parameter.

The sending module 12 is further configured to send the first key negotiation parameter and the second key negotiation parameter to the first UE, and send the first key negotiation parameter and the second key negotiation parameter to the second UE.

For specific implementation of the technical solution, reference may be made to the technical solution of the method embodiment shown in FIG. 4, and implementation principles and technical effects of the technical solution are similar and are not described herein again.

In the foregoing implementation manners, the key negotiation parameter includes one or any combination of the following parameters: a nonce, a connection ID, a radio resource connection ID, an application ID, a C-RNTI, a count value of a counter, and a constant.

Figure 10:
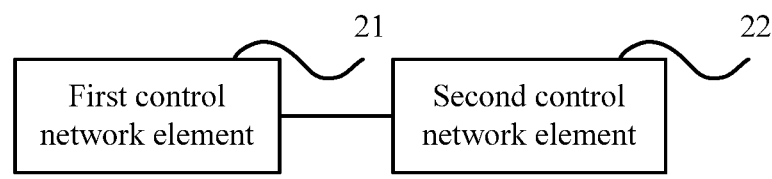
FIG. 10 is a schematic structural diagram of a control system according to an embodiment of the present disclosure.

FIG. 10 is a schematic structural diagram of an embodiment of a control system according to the present disclosure. As shown in FIG. 10, the control system in this embodiment may include a first control network element 21 to which a first UE is attached and a second control network element 22 to which a second UE is attached, where the first control network element 21 interacts with the second control network element 22 in order to send a first key negotiation parameter and/or a second key negotiation parameter to the first UE and the second UE such that the first UE and the second UE generate a key according to the first key negotiation parameter and the second key negotiation parameter.

The control network element in this embodiment may be configured to execute the technical solution of the method embodiment shown in FIG. 1. Implementation principles and technical effects of the control network element are similar and are not described herein again.

In an implementation manner, the first control network element 21 is further configured to receive a third key negotiation parameter sent by the first UE, generate the first key negotiation parameter according to the third key negotiation parameter and a shared key between the first UE and the first control network element 21, and send the first key negotiation parameter to the second control network element such that the second control network element sends the first key negotiation parameter to the second UE.

The second control network element 22 is further configured to receive a fourth key negotiation parameter sent by the second UE, generate the second key negotiation parameter according to the fourth key negotiation parameter and a shared key between the second UE and the control network element, and send the second key negotiation parameter to the first control network element such that the first control network element sends the second key negotiation parameter to the first UE.

The shared key includes one or a combination of the following keys: an authentication vector underlying key Kasme, a NAS key, and a NH key.

For specific implementation of the technical solution, reference may be made to the technical solution of the method embodiment shown in FIG. 5, and implementation principles and technical effects of the technical solution are similar and are not described herein again.

In another implementation manner, the first control network element 21 is further configured to receive the first key negotiation parameter sent by the first UE, and send the first key negotiation parameter to the second control network element such that the second control network element sends the first key negotiation parameter to the second UE.

The second control network element 22 is further configured to receive the second key negotiation parameter sent by the second UE, and send the second key negotiation parameter to the first control network element such that the first control network element sends the second key negotiation parameter to the first UE.

For specific implementation of the technical solution, reference may be made to the technical solution of the method embodiment shown in FIG. 6, and implementation principles and technical effects of the technical solution are similar and are not described herein again.

In still another implementation manner, the first control network element 21 is further configured to send the second key negotiation parameter to the first UE.

The second control network element 22 is further configured to send the first key negotiation parameter to the second UE.

For specific implementation of the technical solution, reference may be made to the technical solution of the method embodiment shown in FIG. 7, and implementation principles and technical effects of the technical solution are similar and are not described herein again.

In the foregoing implementation manners, the key negotiation parameter includes one or any combination of the following parameters: a nonce, a connection ID, a radio resource connection ID, an application ID, a C-RNTI, a count value of a counter, and a constant.

Figure 11:
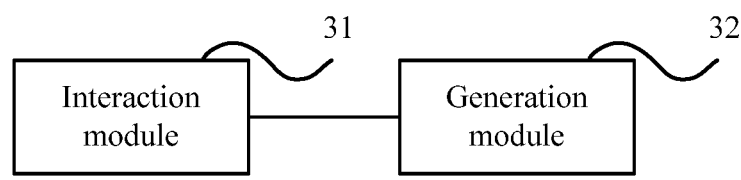
FIG. 11 is a schematic structural diagram of a user equipment according to an embodiment of the present disclosure.

FIG. 11 is a schematic structural diagram of an embodiment of a UE according to the present disclosure. As shown in FIG. 11, the UE in this embodiment is a first UE, and the first UE may include an interaction module 31 and a generation module 32, where the interaction module 31 is configured to receive a key negotiation parameter sent by a control network element, and the generation module 32 is configured to generate a key according to the key negotiation parameter.

The control network element in this embodiment may be configured to execute the technical solution of the method embodiment shown in FIG. 8. Implementation principles and technical effects of the control network element are similar and are not described herein again.

In an implementation manner, the interaction module 31 is further configured to before receiving the key negotiation parameter sent by the control network element, send a third key negotiation parameter to the control network element such that the control network element generates a first key negotiation parameter according to the third key negotiation parameter and a shared key between the first UE and the control network element.

Correspondingly, the interaction module 31 may be further configured to receive a second key negotiation parameter sent by the control network element, where the second key negotiation parameter is generated by the control network element according to a fourth key negotiation parameter sent by a second UE and a shared key between the second UE and the control network element.

The generation module 32 may be further configured to generate the first key negotiation parameter according to the third key negotiation parameter and the shared key between the first UE and the control network element, and generate the key according to the first key negotiation parameter and the second key negotiation parameter.

The shared key includes one or a combination of the following keys: an authentication vector underlying key Kasme, a NAS key, and a NH key.

For specific implementation of the technical solution, reference may be made to the technical solution of the method embodiment shown in FIG. 2 or FIG. 5, and implementation principles and technical effects of the technical solution are similar and are not described herein again.

In another implementation manner, the interaction module 31 is further configured to before receiving the key negotiation parameter sent by the control network element, send a first key negotiation parameter to the control network element such that the control network element sends the first key negotiation parameter to the second UE.

Correspondingly, the interaction module 31 may be further configured to receive a second key negotiation parameter sent by the control network element, where the second key negotiation parameter is sent by the second UE to the control network element.

The generation module 32 may be further configured to generate the key according to the first key negotiation parameter and the second key negotiation parameter.

For specific implementation of the technical solution, reference may be made to the technical solution of the method embodiment shown in FIG. 3 or FIG. 6, and implementation principles and technical effects of the technical solution are similar and are not described herein again.

In still another implementation manner, the interaction module 31 may be further configured to receive a first key negotiation parameter and a second key negotiation parameter sent by the control network element.

The generation module 32 may be further configured to generate the key according to the first key negotiation parameter and the second key negotiation parameter.

For specific implementation of the technical solution, reference may be made to the technical solution of the method embodiment shown in FIG. 4 or FIG. 7, and implementation principles and technical effects of the technical solution are similar and are not described herein again.

In the foregoing implementation manners, the key negotiation parameter includes one or any combination of the following parameters: a nonce, a connection ID, a radio resource connection ID, an application ID, a C-RNTI, a count value of a counter, and a constant.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a read-only memory (ROM), a random-access memory (RAM), a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A key negotiation processing method, comprising:
    acquiring, by a control network element, a first key negotiation parameter and a second key negotiation parameter by:
        receiving, by the control network element, a third key negotiation parameter from a first user equipment (UE); and
        generating the first key negotiation parameter according to the third key negotiation parameter and a first shared key between the first UE and the control network element,
    acquiring, by the control network element, the first key negotiation parameter and the second key negotiation parameter in response to a proximity communication connection request being sent between the first UE and a second UE, the control network element acquiring the second key negotiation parameter by:
        receiving, by the control network element, a fourth key negotiation parameter from the second UE; and
        generating the second key negotiation parameter according to the fourth key negotiation parameter and a second shared key between the second UE and the control network element; and
    sending, by the control network element, at least one of the first key negotiation parameter or and the second key negotiation parameter to the first UE and the second UE such that the first UE and the second UE generate a first key according to the first key negotiation parameter and the second key negotiation parameter, and a proximity communication connection is established between the first UE and the second UE using the first key.

2. The method of claim 1, wherein acquiring, by the control network element, the first key negotiation parameter comprises receiving, by the control network element, the first key negotiation parameter from the first UE, and acquiring, by the control network element, the second key negotiation parameter comprises receiving, by the control network element, the second key negotiation parameter from the second UE.

3. The method of claim 1, wherein sending, by the control network element, at least one of the first key negotiation parameter and the second key negotiation parameter to the first UE and the second UE comprises:
    sending, by the control network element, the second key negotiation parameter to the first UE; and
    sending, by the control network element, the first key negotiation parameter to the second UE.

4. The method of claim 1, wherein acquiring, by the control network element, the first key negotiation parameter and the second key negotiation parameter comprises generating, by the control network element, the first key negotiation parameter and the second key, negotiation parameter.

5. The method of claim 4, wherein sending, by the control network element, at least one of the first key negotiation parameter or the second key negotiation parameter to the first UE and the second UE comprises:
    sending, by the control network element, the first key negotiation parameter and the second key negotiation parameter to the first UE; and
    sending, by the control network element, the first key negotiation parameter and the second key negotiation parameter to the second UE.

6. The method of claim 1, wherein the control network element comprises a mobility management entity.

7. The method of claim 1, wherein the first key negotiation parameter comprises a nonce.

8. The method of claim 1, wherein the first key negotiation parameter comprises a connection identifier.

9. The method of claim 1, wherein the first key negotiation parameter comprises an application identifier.

10. The method of claim 1, wherein the first key negotiation parameter comprises an identifier of a cell in which the first UE is located.

11. The method of claim 1, wherein the first key negotiation parameter comprises a count value of a counter.

12. The method of claim 1, wherein the first key negotiation parameter comprises a constant.

13. The method of claim 1, wherein the second key negotiation parameter is calculated according to the first key negotiation parameter and a key derivation function.

14. The method of claim 1, wherein the first UE and the second UE use a same key generation algorithm.

15. A key negotiation processing method, comprising:
    acquiring, by, a control network element, a first key negotiation parameter and a second key negotiation parameter, the first key negotiation parameter and the second key negotiation parameter being acquired by the control network element in response to a proximity communication connection request being sent between a first user equipment (UE) and a second UE, the control network element comprising a first control network sub-element to which the first UE is attached and a second control network sub-element to which the second UE is attached, and the control network element acquiring the first key negotiation parameter and the second key negotiation parameter by:
receiving, by the first control network sub-element, a third key negotiation parameter from the first UE;
generating, by the first control network sub-element, the first key negotiation parameter according to the third key negotiation parameter and a first shared key between the first UE and the first control network sub-element;
sending, by the first control network sub-element, the first key negotiation. parameter to the second control network sub-element such that the second control network element sends the first key negotiation parameter to the second UE;
receiving, by the second control network sub-element, a fourth key negotiation parameter from the second UE;
generating, by the second control network sub-element, the second key negotiation parameter according to the fourth key negotiation parameter and a second shared key between the second UE and the second control network sub-element; and
sending, by the second control network sub-element, the second key negotiation parameter to the first control network sub-element such that the first control network sub-element sends the second key negotiation parameter to the first UE; and
sending, by the control network element, at least one of the first key negotiation parameter or the second key negotiation parameter to the first UE and the second UE such that the first UE and the second UE generate a first key according to the first key negotiation parameter and the second key negotiation parameter, and a proximity communication connection is established between the first UE and the second UE using the first key.

16. The method of claim 15, wherein sending, by the control network element, at least one of the first key negotiation parameter or the second key negotiation parameter to the first UE and a second UE comprises:
sending, by the first control network sub-element, the second key negotiation parameter to the first UE; and
sending, by the second control network element, the first key negotiation parameter to the second UE.

17. A key negotiation processing method, comprising:
acquiring, by a control network element, a first key negotiation parameter and a second key negotiation parameter, the first key negotiation parameter and the second key negotiation parameter being acquired by the control network element in response to a proximity communication connection request being sent between a first user equipment (UE) and a second UE, the control network element comprising a first control network sub-element to which the first UE is attached and a second control network sub-element to which the second UE is attached, and the control network element acquiring the first key negotiation parameter and the second key negotiation parameter by:
receiving, by the first control network sub-element, the first key negotiation parameter from the first UE;
sending, by the first control network sub-element, the first key negotiation parameter to the second control network sub-element such that the second control network sub-element sends the first key negotiation parameter to the second UE;
receiving, by the second control network element, the second key negotiation parameter from the second UE; and
sending, by the second control network element, the second key negotiation parameter to the first control network sub-element such that the first control network sub-element sends the second key negotiation parameter to the first UE; and
sending, by the control network element, at least one of the first key negotiation parameter or the second key negotiation parameter to the first UE and the second UE such that the first UE and the second UE generate a first key according to the first key negotiation parameter and the second key negotiation parameter, and a proximity communication connection is established between the first UE and the second UE using the first key.

18. A key negotiation processing method, comprising:
acquiring, by a control network element, a first key negotiation parameter by:
receiving, by the control network element, a third key negotiation parameter from a first user equipment (UE); and
generating the first key negotiation parameter according to the third key negotiation parameter and a first shared key between the first UE and the control network element;
acquiring, by the control network element, a second key negotiation parameter by:
receiving, by the control network element, a fourth key negotiation parameter from a second UE; and
generating the second key negotiation parameter according to the fourth key negotiation parameter and a second shared key between the second UE and the control network element; and
sending, by the control network element, at least one of the first key negotiation parameter or the second key negotiation parameter to the first UE and the second UE such that the first UE and the second UE generate a first key according to the first key negotiation parameter and the second key negotiation parameter, the control network element comprising a first control network sub-element to which the first UE is attached and a second control network sub-element to which the second UE is attached, and the control network element acquiring the first key negotiation parameter and the second key negotiation parameter by:
receiving, by the first control network sub-element, the first key negotiation parameter from the first UE;
sending, by the first control network sub-element, the first key negotiation parameter to the second control network sub-element such that the second control network sub-element sends the first key negotiation parameter to the second UE;
receiving, by the second control network element, the second key negotiation parameter from the second UE;
receiving, by the first control network sub-element, a third key negotiation parameter from the first UE;
generating, by the first control network sub-element, the first key negotiation parameter according to the third key negotiation parameter and a first .shared key between the first UE and the first control network sub-element;
sending, by the first control network sub-element, the first key negotiation parameter to the second control network sub-element such that the second control network element sends the first key negotiation parameter to the second UE;

receiving, by the second control network sub-element, a fourth key negotiation parameter from the second UE;

generating, by the second control network sub-element, the second key negotiation parameter according to the fourth key negotiation parameter and a second shared key between the second UE and the second control network sub-element; and sending, by the second control network sub-element, the second key negotiation parameter to the first control network sub-element such that the first control network sub-element sends the second key negotiation parameter to the first UE.

19. The method of claim 18, wherein the control network element comprises a mobility management entity, the first key negotiation parameter comprises an identifier of a cell in which the first UE is located, and the second key negotiation parameter is calculated according to the first key negotiation parameter and a key derivation function.

* * * * *

UNITED STATES PATENT AND TRADEMARK OFFICE
CERTIFICATE OF CORRECTION

PATENT NO. : 10,320,917 B2
APPLICATION NO. : 15/146690
DATED : June 11, 2019
INVENTOR(S) : Bo Zhang et al.

Page 1 of 1

It is certified that error appears in the above-identified patent and that said Letters Patent is hereby corrected as shown below:

In the Claims

Column 17, Line 49, delete "element," and insert -- element; --

Column 17, Line 63, delete "or and the second" and insert -- or the second --

Column 18, Line 25, delete "key, negotiation" and insert -- key negotiation --

Column 19, Line 11, delete "negotation. parameter" and insert -- negotiation parameter --

Column 20, Line 60, delete "first .shared" and insert -- first shared --

Signed and Sealed this
Twentieth Day of August, 2019

Andrei Iancu
*Director of the United States Patent and Trademark Office*